United States Patent Office 2,913,897
Patented Nov. 24, 1959

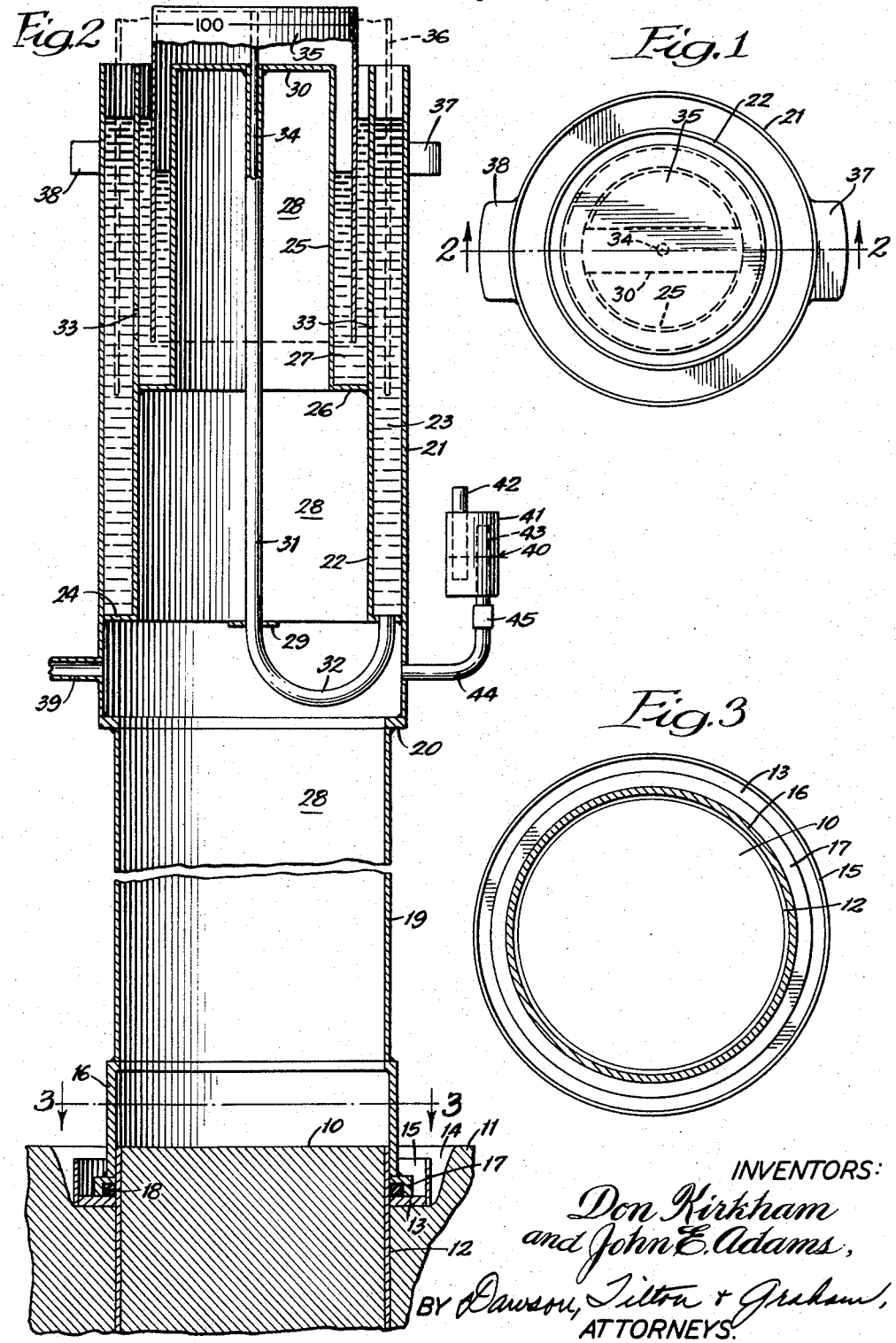

2,913,897

APPARATUS FOR MEASURING DIFFUSION COEFFICIENTS OF SOIL IN PLACE

Don Kirkham, Ames, Iowa, and John E. Adams, Temple, Tex., assignors to Iowa State College Research Foundation, Inc., Ames, Iowa, a corporation of Iowa Application September 28, 1956, Serial No. 612,659

6 Claims. (Cl. 73—38)

This invention relates to a gas permeameter and more particularly to apparatus for measuring diffusion coefficients of soil and similar materials.

An object of the invention is to provide apparatus adapted for convenient use in measuring the diffusion rate of a gaseous medium into a permeable material such as soil, and which is characterized by its simplicity and by the accuracy of the results achieved thereby.

Another object is that of providing apparatus that is useful in defining a test sample area of soil in its environment, and in which a gaseous medium—in particular, air—is sealed within the apparatus above the soil sample area and has a predetermined pressure of constant value applied thereto tending to compress the same against the surface of the test sample, and in which indicia means are incorporated for measuring the movement of the gas into the soil sample in a given period of time, whereby the coefficient of permeability of the soil to the gas may be ascertained. Yet a further object is in providing in apparatus of the character described, float means for applying a predetermined pressure to the confined gas, wherein the apparatus is characterized by being interchangeably used with floats of different size depending upon whether the soil test sample has a relatively high or low coefficient of permeability. Additional objects and advantages will become apparent as the specification develops.

An embodiment of the invention is illustrated in the accompanying drawing, in which—

Figure 1 is a top plan view of apparatus embodying the invention; Figure 2 is a vertical sectional view taken along line 2—2 of Figure 1; and Figure 3 is a transverse sectional view taken along the line 3—3 of Figure 2.

In Figure 2 the apparatus is shown in position for making a permeability test of a soil sample in its environmental surrounding, the sample under test being designated wtih the numeral 10 and the ground generally being designated by the numeral 11. The soil sample is defined by an infiltration or diffusion member 12 in the form of a tube or hollow cylinder driven into the ground 11 by a suitable tool. Preferably, the bottom end of the cylinder or tube 12 is beveled to facilitate the penetration of that member into the ground in defining the soil sample 10.

Intermediate the ends of the tube 12 and extending outwardly therefrom is a trough or flange member 13 rigidly affixed to the tubular member in any suitable manner. It will be apparent from Figure 2 that a channel or recess 14 must be formed in the ground about the infiltration or diffusion member 12 for accommodating the flange 13. Preferably, the flange 13 is equipped with an upwardly extending annular ring 15 thereabout, and interiorly of the ring 15 is a shield 16 that slidably receives the upper end of the tubular member 12 therein and extends upwardly therefrom. At its lower end, the shield 16 is provided with an L-shaped channel member 17 which is soldered or otherwise secured thereto and, as is illustrated in Figure 2, the L-shaped channel member is turned on its side so as to define a seal chamber adapted to receive an O-ring or other seal member 18 therein that forms with the channel member, the tubular diffusion member 12 and the annular flange 13, a seal that prevents the escape of fluid from the compartment defined within the shield 16.

Extending upwardly from the shield 16, which for purposes of identification may be called a splash shield, is an air shield 19 soldered or otherwise fixedly secured to the splash shield. At its upper end, the shield 19 is equipped with a laterally extending annular flange 20, and extending upwardly therefrom is a tubular or cylindrical extension 21 that defines with a smaller concentric cylinder 22 mounted therein, an outer water tank 23. The lower end of the tank 23 is closed by a bottom wall 24 extending horizontally between the outer and inner cylinders or shells 21 and 22.

Concentric within the cylinders 21 and 22 is an inner cylinder 25 substantially shorter than the cylinder 22, which in turn is substantially shorter than the cylinder 21. The bottom closure wall 26 extends between the lower end of the inner smaller cylinder 25 and the cylinder 22, and forms a bottom closure for an inner water tank 27 which, as is apparent from the drawing, has a total volume substantially less than that of the outer tank 23.

The entire volume or compartment defined within the shields 16 and 19 and within the concentric tubes or cylinders 21, 22 and 25 may be referred to as an air chamber of the gaseous type, and for identification is designated with the numeral 28. It will be appreciated that the entire volume 28 is above the surface of the soil test sample 10, and is aligned therewith. It will be noted that a support member 29 extends transversely across the chamber 28 adjacent the bottom closure wall 24 of the larger outer water tank, and is secured to that wall by any suitable means. A similar narrow support member 30 extends across the upper end of the inner concentric cylinder 25 and is secured rigidly thereto. In the illustration given, the supports 29 and 30 are both narrow members and are oriented at right angles with respect to each other. Fixed to these members in openings therein provided for receiving the same, is a float guide tube 31, the lower end portion of which is arcuate as is shown at 32, and communicates with the large outer water tank through an opening in the bottom wall 24 thereof. Thus, since the guide tube 31 is concentric with the outer tank 23 and substantially lies along the axis of the cylindrical walls thereof, the tube will be filled with liquid to the elevation thereof present within the outer tank 23.

It should be noted that the inner and outer tanks are in open communication with each other through apertures 33 in the concentric tank wall member or cylinder 22 so that a float guide tube will also have liquid therein when (as is the case in Figure 2) the inner tank 27 is the one actually being used in making a test. The purpose of providing liquid within the float guide tube 31 is to lubricate the float guide rod 34 slidably received within the tube 31, and which is effective to constrain movement of the float member 35 secured thereto to a path concentric with the cylinder members 21, 22 and 25. It will be apparent that the rod 34 may be secured to the float 35 by any suitable means.

In the illustration, the float 35 is a small one which is used in conjunction with the smaller inner water tank 27. This float is employed when the soil under test has a relatively low permeability. Preferably, this float has indicia marks along the outer surface thereof that may be divided into 100 milliliter subdivisions. The standard or index for use with such division lines is the upper end of the cylindrical members 21 and 22.

When the apparatus is employed with soils that are more permeable, a larg float such as the float 36 illustrated by broken lines in Figure 2 is employed, and ordinarily the larger float will have indicia marks of larger separation than those employed with the smaller float and, for example, may have 500 milliliter subdivisions. When a large tank is employed, it of course will be equipped with a guide rod 34 so that the movement of its walls between the concentric wall members 21 and 22 remains concentric or coaxial therewith.

The apparatus, if desired, may be provided with a pair of opposed handles 37 and 38 to facilitate lifting and moving the device. Also, the chamber 28 will be connected by a manometer tube 39 with a standard manometer; and since manometers and their function are well known in the art, one is not illustrated in the drawing and, for purposes of simplifying the disclosure, will not be described herein. Used in conjunction with the monometer is an air inlet valve 40 comprising a valve housing 41, an inlet tube 42 for air communicating with the interior thereof, and a tube 43 also communicating with the interior of the casing 41 and which at its outer end is connected to the chamber 28 through a connector conduit 44 and coupling 45. The valve housing 41 is partially filled with water and when the air in the chamber 28 is under pressure, as in Figure 2, the water will rise in the tube 42 to the same height that it falls in cylinder 25 below the level in cylinder 23. Tube 42 must be long enough to prevent the air pressure in chamber 28 from blowing out water through the tube 42. The purpose of the air inlet valve is to let air into the chamber 28 when the float 35 is lifted vertically.

In use of the apparatus, the infiltration or permeability cylinder 12 is driven into the ground to define a test soil sample, and the splash guard 16 and structure thereabove is mounted in position with respect to the infiltration cylinder and trough 13, as shown in Figure 2. If desired, the trough defined by the flange 13, ring 15 and splash guard 16 may be filled with water to prevent the escape of gas from the chamber 28. The ring 15 must then be of sufficient height to support a head of water greater than the water head equivalent of the pressure caused by the float 35.

The inner or outer tanks are filled with water or other liquid as shown, and the requisite float—whether the small float 35 or large float 36—is positioned as shown with the guide rod 34 thereof slidably received within the guide tube 31. The float members are designed and constructed so as to provide a compression force acting on a gaseous medium within the chamber 28 so as to maintain a constant pressure therein.

It will be appreciated that the float 35 or 36, through its weight in excess of the water buoyant force acting on its submerged walls, will function to maintain a constant pressure within the chamber 28. The liquid within the inner or outer water tanks will prevent the escape of fluid from about the float, and the O-ring 18 and/or fluid in the ring 15 will prevent the escape of the gaseous medium, except through the soil, at the lower end of the chamber 28. As has been described before, the rod 34 which is slidable within the lubricated guide tube 31 will maintain the float member in alignment and concentric with the tank wall members 21, 22 and 25.

After the float has been positioned with its guide rod slidably supported within guide tube 31, the pressure within chamber 28, as represented by the manometer, and the position of the float as indicated by the reference lines and numerals on its outer surface, are recorded. Further recordings may be taken at selected intervals thereafter. It is believed apparent that the difference between the initial and subsequent gas volume readings, as represented by the indicia on the outer surface of the descending float in alignment with the upper ends of the surrounding cylinders, constitutes the total amount of gas which permeates or diffuses into the soil in a certain recorded period of time and at a recorded pressure, as indicated by the manometer and as determined by the weight and size of the particular float.

Frequently, it is desirable to make an air permeability measurement within a certain period of time (say, for example, 24 hours) after the soil sample has been subjected to a simulated rainfall wherein the erosion rate, infiltration rate, and run-off rate of the soil have been measured. A permeability test following the testing of the above named physical properties of the soil would give information on the relation of rainfall wetting to aeration of the soil. Apparatus useful in making the physical tests involving the application of simulated rain to the soil test sample is disclosed in the copending application of Don Kirkham and John E. Adams, Serial No. 615,990, filed October 15, 1956.

While in the foregoing specification an embodiment of the invention has been described in considerable detail for purposes of making a complete disclosure thereof, it will be appreciated that those skilled in the art may make numerous changes in the details thereof without departing from the spirit and scope of the invention.

We claim:

1. In an apparatus of the character described for measuring the permeability of soil and like materials, a diffusion member adapted to penetrate soil material to define a test sample thereof, a shield extending upwardly from said diffusion member and sealingly engaging the same and defining a chamber above the diffusion member and above the test sample of soil defined thereby, an annular tank at the upper end of said shield for receiving a liquid therein, a float closing the upper end of said chamber and having side walls receivable within said tank, said float being vertically movable and being provided with a downwardly extending guide rod, a guide tube slidably receiving said rod for constraining movement of said float to a predetermined vertical path, passage means extending between the lower end of said guide tube and said tank for the flow of liquid therebetween, and means for admitting a gas to said chamber, whereby, said float is supported within the liquid contained within said guide tube and said tank, said tank providing a liquid-gas interface of limited area within said chamber by reason of its annular construction.

2. In apparatus of the character described, a diffusion member receivable within a soil material for defining a test sample thereof, a shield sealingly engaging said diffusion member and extending upwardly therefrom, a plurality of concentric wall members at the upper end of said apparatus, closure walls extending between certain of said concentric wall members to define inner and outer annular concentric tanks having open upper ends of limited area, the outermost tank being larger than the innermost tank, a float comprising a cylindrical member having a closed upper end dimensioned so as to be receivable within one of said tanks, said shield and concentric wall members defining a chamber adapted to contain a gaseous material, said float member defining a closure for said chamber at the upper end thereof, and means for constraining movement of said float member along a path of travel concentric with said concentric wall members.

3. The apparatus of claim 2 in which said last mentioned means comprises a hollow tube, means supporting the same, and a guide rod secured to said float and slidably receivable within said guide tube.

4. The apparatus of claim 3 in which said guide tube at the lower end thereof is in open communication with the outermost of said tanks, and in which all of said tanks are in communication with each other.

5. The apparatus of claim 2 in which means are provided for maintaining the pressure within said chamber at a preselected value.

6. The apparatus of claim 5 in which said float member is provided with indicia means, and in which the upper ends of said concentric wall members provide an index whereby the diffusion of a material within said chamber into a test sample can be measured by movement of said float with respect to said index.

References Cited in the file of this patent

UNITED STATES PATENTS

| | | | |
|---|---|---|---|
| 1,234,505 | Stillman | | July 24, 1917 |
| 2,194,891 | Dietert | | Mar. 26, 1940 |
| 2,516,188 | Dietert et al. | | July 25, 1950 |
| 2,662,395 | Brazier | | Dec. 15, 1953 |

FOREIGN PATENTS

| 724,626 | Germany | Sept. 2, 1942 |
|---|---|---|